United States Patent [19]

Szembrot et al.

[11] Patent Number: 5,437,792

[45] Date of Patent: Aug. 1, 1995

[54] PROCESS OF RECOVERING SILVER FROM PHOTOGRAPHIC SOLUTIONS

[75] Inventors: Albert R. Szembrot, Penfield; Charles S. Christ, Jr., Fairport, both of N.Y.

[73] Assignee: Eastman Kodak Company, Rochester, N.Y.

[21] Appl. No.: 281,382

[22] Filed: Jul. 27, 1994

[51] Int. Cl.$^6$ .............................................. C02F 1/62
[52] U.S. Cl. ................................. 210/727; 210/729; 210/734; 210/912
[58] Field of Search ............... 210/912, 734, 727, 728, 210/729

[56] References Cited

U.S. PATENT DOCUMENTS

| | | |
|---|---|---|
| 4,525,509 | 6/1985 | Hunter et al. |
| 4,666,964 | 5/1987 | Hunter et al. |
| 4,816,508 | 3/1989 | Chen |
| 4,904,715 | 2/1990 | Hunter et al. |
| 5,100,851 | 5/1992 | Hunter et al. |
| 5,200,086 | 4/1993 | Shah et al. ............ 210/708 |
| 5,205,939 | 4/1993 | Syrinek ................. 210/727 |
| 5,288,728 | 2/1994 | Spears et al. ......... 210/729 |

FOREIGN PATENT DOCUMENTS

| | | |
|---|---|---|
| 222579 | 5/1987 | European Pat. Off. |
| 62-262799 | 11/1987 | Japan |
| 63-267408 | 11/1988 | Japan |
| 1411985 | 10/1975 | United Kingdom |

*Primary Examiner*—Neil McCarthy
*Attorney, Agent, or Firm*—John R. Everett

[57] ABSTRACT

A process for removing silver from a silver containing photoprocessing solution, including the steps of:

a) mixing a mercapto-s-triazine, or a water soluble salt thereof, with the solution thereby causing formation of a mixture of i) precipitates and fines of silver mercapto-s-triazine and ii) the solution;

b) mixing a copolymer flocculant with the mixture thereby causing flocculation and agglomeration of the silver TMT fines; wherein the copolymer i) consist of monomers selected from the group consisting of acryloyloxyethyl trimethylamine chloride and acrylamide and ii) has a reduced viscosity of 21 to 30 dL/g.

10 Claims, No Drawings

PROCESS OF RECOVERING SILVER FROM PHOTOGRAPHIC SOLUTIONS

FIELD OF THE INVENTION

The present invention relates to a process of recovering silver from seasoned photographic solutions.

BACKGROUND OF THE INVENTION

The commercial processing of photographic materials produces seasoned (used) Solutions containing silver ions. Environmental regulations restrict the discharge of solutions containing silver to concentrations much less than the silver concentrations generally found in seasoned solutions. Thus the silver concentrations in seasoned solutions must be greatly reduced before discharge into the environment.

A much improved precipitation process for removal of silver from seasoned silver containing solutions is disclosed in U.S. Pat. No. 5,288,728. A mercapto-s-triazine compound is used to precipitate silver. This process results in the formation of fine, sub-micron, colloidal particles of silver mercapto-s-triazine that prevent cost effective use of conventional separation methods.

One application of the mercapto-s-triazine precipitation method is the secondary, batch-mode recovery of silver by large photofinishers. This involves the batch recovery of silver from solutions that have already undergone another method of silver recovery to remove a major portion of the silver. Typically, the fine particles, referred to above, are allowed to settle to the bottom of the treatment vessel. Following a prolonged settling time, a sludge containing the fines is recovered after a decant operation and manually collected in filter bags. The lengthy settling time results in a prolonged total cycle time that necessitates installation of large and expensive equipment to provide the capacity to treat the volume of silver containing solutions generated over several hours.

A second potential application of this technique is the primary recovery of silver from solutions having concentrations of silver greater than 1 g/L. No method currently exists that provides efficient and economic phase separation because the large volumes of silver containing sludges generated.

U.S. Pat. No. 5,288,728 suggests use of flocculants in combination with the precipitation process. However no directions are given concerning what materials might be used as flocculants. There are many different anionic, cationic and nonionic polymeric flocculants. A specific polymer may work well in some solutions to agglomerate precipitated fines. In other solutions that material may well cause a precipitate to disperse.

SUMMARY OF THE INVENTION

The present invention provides a process for removing silver from a silver containing photoprocessing solution, comprising the steps of:
a) mixing a mercapto-s-triazine, or a water soluble salt thereof, with the solution thereby causing formation of a mixture of i) precipitates and fines of silver mercapto-s-triazine and ii) the solution;
b) mixing a copolymer flocculant with the mixture thereby causing flocculation and agglomeration of the silver TMT fines; wherein the copolymer i) consist of monomers selected from the group consisting of acryloyloxyethyl trimethylamine chloride and acrylamide and ii) has a reduced viscosity of 21 to 30 dL/g In summary, the invention provides a process for recovering silver from seasoned photographic solutions by the addition of a mercapto-s-triazine compound to precipitate the silver, followed by the addition of a high molecular weight, cationic copolymer of acrylamide and acryloyloxyethyl trimethyl ammonium chloride to agglomerate the fine particles and greatly improve the phase separation. This process consistently lowers silver concentration in seasoned photographic processing solutions to within most environmental discharge limits.

This invention allows the use of inexpensive and readily-available filter media for separation of silver precipitate from a treated solution. Filtration problems are solved. Automation of the process in a continuous-mode has been enabled as disclosed in U.S. Ser. No. 08/206,335, filed Mar. 4, 1994, in the name of T. W. Bober, et al and expressly incorporated herein by reference. The time required to carry out the process has been reduced thereby minimizing equipment size and space requirements. The ease of operation reduces operator labor, physical contact with silver precipitate, and the potential for silver loss as a result of spillage. This invention allows the separation of the silver precipitate in a convenient, self-contained, vessel which requires no additional handling or preparation prior to shipment to a silver refiner. See U.S. application Ser. No. 08/206,335.

DETAILS OF THE INVENTION

The mercapto-s-triazine used in this invention is selected from those having the following structure (I):

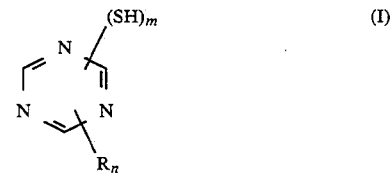

wherein:
R is hydrogen, —NH4, —OH, alkyl having 1 to 8 carbon atoms, alkoxy having 1 to 8 carbon atoms, phenyl, cyclohexyl, oxazinyl, phenoxy, —NR'2 or SR"; wherein R' is hydrogen, alkyl having 1 to 8 carbon atoms, phenyl, cyclohexyl, naphthyl or benzyl; and wherein R" is allyl having 1 to 8 carbon atoms, phenyl, cyclohexyl, naphthyl or benzyl; m is an integer from 1 to 3; and n is 0 or an integer from 1 to 2.

The effectiveness of copolymer flocculants used in this invention can be enhanced by adjusting mole ratios of the monomers therein based on the concentration of silver in the seasoned photographic processing solution being treated.

For solutions with a low silver content (<1 g/L), acceptable performance is achieved with a copolymer containing 4 to 27 mole percent acryloyloxyethyl trimethylamine chloride. A preferred composition contains 7–20 mole percent of this monomer with 9–14 mole percent being especially useful.

For solutions with a high silver content (1–15 g/L), acceptable performance is achieved with a copolymer containing 0.1 to 7 mole percent acryloyloxyethyl trimethylamine chloride. A preferred composition contains 0.3 to 4 mole percent of this monomer with 0.5 to 2 mole percent being especially useful.

Addition of the flocculant to give a flocculant concentration of 10 to 100 ppm in the precipitated silver mixture results in the agglomeration of the insoluble silver mercapto-s-triazine fines, formation of larger more easily separated particles and simultaneous reduction of colloidal silver precipitate. Preferred concentrations are between 15 and 60 ppm, and the best concentration is from 30 to 50 ppm. Larger concentrations of flocculant may be useful to some degree but are not optimum for the purpose described here.

The copolymer flocculants are further characterized herein by their reduced viscosity. The use of viscometry is particularly amenable to characterization of many commercial polymers that include additives for various purposes to enhance stability. Reduced viscosity values measured under a well defined set of conditions provide practical characterizing information. The procedure for obtaining the reduced viscosity value is given below.

Polymer Solution Preparation (A two step make down procedure is followed to reproducibly obtain homogeneous polymer solutions)

1. 0.5 g of the copolymer flocculant is added with stirring at 600 rpm to 98 g of distilled water, and the solution is stirred for 1 hour. This yields a solution of about 0.5% flocculant.
2. Dilute the 0.5% (wt/wt) flocculant solution made in step one to a 0.1% (wt/wt) solution. Mix the solution for at least 10 minutes or until the solution is well mixed.
3. Mix equal 4.00±0.02 g masses of the 0.1% wt/wt solution of flocculant and 2.0N NaCl. The resulting solution should contain approximately 0.05 g flocculant/100 mL solution.
4. Finally, pass the solution resulting from step 3 through a 200 mesh screen and proceed immediately to the measurement of the viscosity using a Cannon Ubbelohde capillary viscometer at 30.00°±0.02° C.

The time parameter, t, i.e. the time it takes for the solution to fall through the capillary, for both 1N NaCl solvent and the flocculant solution, must be determined in order to obtain the reduced viscosity of the polymer solution.

1. Add about 10 ml of 1N NaCl solvent to the viscometer and place in a constant temperature bath at 30.00°±0.02° C. allowing sufficient time for temperature equilibrium to be established.
2. Time the descent of the solution through a clean capillary. Repeat the measurement at least three times or until the results agree to within ±0.2s. This gives the value $t_s$ or the time of descent for the solvent.
3. Repeat procedure described in steps 1 and 2 to determine the time for the descent of the polymer solution through the capillary. This gives the value of $t_p$ or the time of descent for the polymer solution.

The reduced viscosity, $\eta_{red}$, is calculated using the following formula:

Reduced Viscosity, $\eta_{red} = [(t_p)/(t_s) - 1]/0.05$ g/dl $t_s$ = time for descent of 1N NaCl solution (see above)
$t_p$ = time for descent of 0.05 g/dl polymer solution (see above).

Useful commercially available copolymer flocculants include materials from Calgon under the trade names POL-E-Z-2406; E-2280; E-2272; E-2267.

The first step in the recovery of silver from seasoned photographic solutions, and in particular from a mixture of such solutions that includes a seasoned photographic stabilizer solution, is carried out by contacting the mixture with a mercapto-s-triazine compound. Silver present in solution forms a water-insoluble complex with the mercapto-s-triazine compound.

In general, the precipitation is carried out in a pH range and the next step is carried out at pH from about 4 to about 14, and practically from about 5 to about 8. A higher pH is preferred because the silver-compound of mercapto-s-triazine (hereinafter "silver complex") is less soluble at a higher pH and will precipitate more readily. The pH may be adjusted by conventional means to suit the operator.

The salt form of the mercapto-s-triazine compounds are preferred for the process of the invention for their increased solubility compared to their acid form. The mercapto-s-triazine compound can be provided in solid (powdered) form or in the form of an aqueous suspension or an aqueous solution for contacting the seasoned solutions. A preferred mercapto-s-triazine compound is the trisodium salt of mercapto-s-triazine, which is sold by Degussa under the product name "TMT-15".

The amount of mercapto-s-triazine used to contact the mixture of seasoned solutions can be determined based on the concentration of silver ion in the mixture. Generally, it is desirable to use in excess of the stiochiometric quantity ratio of the compound to the silver concentration, as may be seen from the examples below. The concentration of silver in the mixture of seasoned solutions can first be determined by means of conventional analytical methods, for example, photometry, potentiometry, or atomic absorption spectroscopy. The operator can also make a best estimate based on the knowledge of the seasoned solutions and the proportions of each such solution present. For example, a bleach-fix solution that is removed from a minilab tank after the system has reached a substantially steady state condition can have a reasonably predictable silver concentration. The excess amount used is dependent on which compound of formula I is used, which can readily be determined by the operator based on preliminary tests with the specific compound to be used. Using the trisodium salt of trimercapto-s-triazine, a preferred amount is from about 1 mole to about 3 moles per 3 moles of silver in the mixture of seasoned solutions undergoing treatment, and particularly preferred is from about 1.5 moles to about 2.0 moles per 3 moles of silver. The ratio is provided per 3 moles of silver since each molecule of trimercapto-s-triazine is capable of complexing 3 silver ions.

The method of the invention is applicable to silver recovery in photoprocessing minilabs. In such labs typically 5 to 10 gallons per day of silver-bearing photoeffluent is generated. The silver concentration ranges from 1 to 4 g/L.

The method is also applicable as a secondary silver recovery method for large photofinishers. In the latter case a large proportion of the silver has been previously recovered by a primary recovery method such as electrolysis.

The method also provides a secondary silver recovery method for large photofinisher operating in a batch-mode recovery process. After being subjected to the process of this invention, the top layer is decanted for discharge or for additional filtration, if necessary. The sludge layer is removed from the bottom of the vessel and sent to a refiner where the silver is recovered.

The seasoned photographic processing solutions from which silver can be recovered by this invention include stabilizers, fixers, bleach fixers, processing overflows containing such materials and mixtures of such processing solutions.

For both minilabs and large photoprocessing operations the method is generally applied as follows:

1. The silver containing solution is provided.
2. A mercapto-s-triazine compound, such as the trisodium salt of trimercapto-s-triazine is mixed with the solution to maximize precipitation of silver ion, thereby forming a two phase mixture of precipitate and liquid. The salt is generally mixed in liquid form (15% by weight trimercapto-s-triazine) at a dosage of approximately 6 to 8 mL per gram of silver in solution. Equipment available from KODAK for this process provide means to mix the trimercapto-s-triazine solution with the photographic solution in batch-mode in a vessel or in-line in a continuous flow operation.
3. Mixing a flocculant, according to this invention, into the above mixture at a concentration of at least 10 mg/L, preferably 30 to 50 mg/L. The flocculant causes growth and agglomeration of precipitated fines. This reduces the number of fines in the mixture.
4. After a short period of rapid mixing subsequent to the addition of the flocculant, the mixture is mixed at a slower rate to allow precipitated particles to grow larger. In Kodak equipment configuration disclosed in previously mentioned U.S. Patent this is accomplished by a tubular reactor coil through which the mixture passes. In this embodiment, the particles continue to grow, and the liquid portion of the two-phase mixture exhibits little or no evidence of suspended fine particles.
5. The mixture is filtered in a filter apparatus. The reduction in fine suspended particles enables the filtration of a considerable volume of seasoned solutions before the filters are clogged.
6. The concentration of silver in the filtrate is typically below 1 mg/L.
7. The silver-bearing sludge collected on the filter may be sent to a refiner for silver recovery.

The following examples establish the improvements in the recovery of silver from seasoned photographic processing solutions when flocculants according to the invention are used with TMT.

EXAMPLE 1

A simulated minilab effluent mixture containing a silver concentration of 2.5 g/L was treated. Initially 400 mL of a 15% by weight solution of trimercapto-s-triazine were added to five gallons of the effluent. This solution was mixed by a laboratory-scale propeller mixer at 100 to 200 rpm. After approximately 10 minutes of reaction time, the resulting slurry, containing insoluble silver-trimercapto-s-triazine salt (AgTMT), was pumped at 200 mls/minute into a second reactor. A 400 mg/L solution of a polymeric flocculant according to the invention containing 1 mole percent acryloyloxyethyl trimethyl ammonium chloride (AETAC) was injected into the second reactor at 20 mL/minute using a bellows pump. This polymer addition rate provided a flocculant concentration in the effluent of 40 mg/L (40 ppm). Precipitated fine particles of AgTMT grew larger and agglomerated. The solution containing these agglomerated particles was directed into a settling filter apparatus where the particles settled at the bottom of this filter allowing the clear liquid phase to pass through. The liquid phase exhibited very good clarity. No suspended particulates were visible in the supernatant. The liquid phase then passed through a pleated media filter core positioned concentrically in the settling filter and was discharged from the apparatus. Thirty-five 5-gallon batches were treated in this apparatus as described above, the sludge continuing to fill the settling filter. This discharge stream was sampled for each batch. After batch 35 was treated, a pressure gauge at the settling filter inlet indicated 12 psig and the filter was replaced. Use of the flocculant enabled a larger volume of silver containing solution to be treated than treatment without flocculant. Silver levels in the filter discharge stream for the 35 batches treated ranged from 0.3 mg/L to 0.7 mg/L.

EXAMPLE 2

This example demonstrates the effect of a flocculant according to the invention containing 1 mole percent acryloyloxethyl trimethyl ammonium chloride (1 mole % AETAC) when the solution is treated and different pH's with trimercapto-s-triazine. A minilab effluent mixture (film process only) was prepared from a combination of the fixer and stabilizers:

KODAK FLEXICOLOR Fixer (8000 mg Ag/L) 45.0%

KODAK FLEXICOLOR Stabilizer (170 mg Ag/L) 55.0%

The effluent had an initial silver concentration of 3.7 g/L at pH 6.1. Eight 500-mL portions of the effluent were prepared in round 600 mL beakers. Glacial acetic acid and concentrated sodium hydroxide were used to adjust pH in each beaker resulting in a pH series of pH 5.0, 5.5, 6.0, 6.1 (unadjusted), 6.5, 7.0, 7.5, and 8.0. For each sample of the series, 10 mL of a 15% trimercapto-s-triazine solution was added. A magnetic stir plate and magnetic stir bars were used to provide the mixing. Each solution was mixed for 5 minutes. Before the addition of the flocculant, the solutions were allowed to settle. After a two-phase system formed in each beaker, approximately 15 to 20 mL supernatant samples were taken from each beaker for analysis. Each sample was filtered using (0.45 μm) disc filters. Next, each beaker was treated with 4 mL of a 5 g/L solution of the flocculant. The resulting mixtures were also filtered using the disc filters to provide samples for silver analyses. Silver results are provided below:

TABLE 1

| pH | Before flocculant mg/L | After flocculant mg/L |
| --- | --- | --- |
| 5.0 | 790 | 410 |
| 5.5 | 96 | 34 |
| 6.0 | 58 | 14 |
| 6.1 | 79 | 16 |
| 6.5 | 24 | 5.6 |
| 7.0 | 14 | 4.4 |
| 7.5 | 9.9 | 4.4 |
| 8.0 | 2.1 | 1.4 |

These results show that the addition of the flocculant reduced the number of small particulates suspended in the liquid phase thereby decreasing the total amount of silver remaining in the effluent. Conversely the amount of silver recovered from TMT treated silver containing effluents was increased.

The following examples 3–4 describe bench-scale jar tests which were conducted during the polymer screening process. In each case, 500 mL of silver-bearing effluent were added to a 1-liter, square beaker. Agitation was provided by a rectangular 3"×1" (7.6×2.54 cm) paddle operated up to 180 rpm. A jar test apparatus was used which was capable of mixing 4 jars simultaneously. With the mixer operating at 180 rpm, 10 mL of trisodium salt of trimercapto-s-triazine as a 15% by weight solution was added. After 15 seconds, an aliquot of a polymeric flocculant was added. After an additional 15 seconds, the mixer speed was reduced to 100 rpm. After 30 seconds at 100 rpm, the mixer speed was reduced to 20 rpm. The mixer was stopped after 1 minute at 20 rpm.

EXAMPLE 3

A minilab effluent mixture consisting of paper process overflows was prepared as indicated below:
KODAK RA100 Bleach-Fix 18.0%
KODAK EKTACOLOR PRIME Stabilizer 82.0%

The initial silver concentration of this mixture was 1.1 g/L. Jar tests were conducted as described. The polymeric flocculants evaluated and the range of dosage used are indicated below:

TABLE 2

| Flocculant Number | | | mg/L |
|---|---|---|---|
| 1 | Non-invention flocculant | high MW, low anionic charge density | 20–50 |
| 2 | Non-invention flocculant | high MW, nonionic | 20–50 |
| 3 | Inventive flocculant | cationic containing 1 mole % AETAC | 10–50 |
| 4 | Inventive flocculant | cationic containing 10 mole % AETAC | 20–50 |
| 5 | Inventive flocculant | cationic containing 4 mole % AETAC | 20–50 |

Flocculants 3, 4 and 5, according to the invention resulted in good flocculant formation and phase separation. Treatment with flocculants 1–2 resulted in poor or marginal performance. Treatment with flocculant 3 gave the best performance at dosages from 20 to 50 mg/L. Flocculant 4 gave the best performance at dosages from 40 to 50 mg/L. Treatment with flocculant 5 resulted in the best performance at dosages from 30 to 50 mg/L. Large particles formed, which settled within 5 seconds. The resulting supernatant was clear with no evidence of fines. The solution treated with flocculant 3 at 20 ppm, also exhibited good flocculant formation and supernatant clarity but not to the degree as the other solutions at the higher dosages.

EXAMPLE 4

A simulated effluent mixture for a large photofinisher, consisting of both film and paper process overflows, was prepared as indicated below:
KODAK FLEXICOLOR Electrosilver Fixer 10.0%
KODAK EKTACOLOR RA Bleach-Fix NR 90.0% and low-flow wash The initial silver concentration of this mixture was 200 mg/L. Jar tests were conducted as described in previous examples. The polymeric flocculants evaluated and the range of dosage used are indicated below:

TABLE 3

| Flocculant Number | | | mg/L |
|---|---|---|---|
| 1 | Non-inventive flocculant | high MW, high anionic charge density | 2–40 |
| 2 | Non-inventive flocculant | high MW, medium anionic charge density | 2–20 |
| 3 | Non-inventive flocculant | high MW, low anionic charge density | 2–40 |
| 4 | Inventive polymer | 1 mole % AETAC | 2–40 |
| 5 | Inventive polymer | 10 mole % AETAC | 25–100 |
| 6 | Inventive polymer | 4 mole % AETAC | 40 |
| 7 | Inventive polymer | 7 mole % AETAC | 40 |

Treatment of the solutions with the three anionic flocculants 1–3 resulted in colloidal suspensions of the silver precipitates. The best flocculant formation and supernatant clarity was exhibited by the solutions treated with inventive flocculants 4–7.

EXAMPLE 5

In order to show the unique circumstances under which the flocculants of the invention show the highest performance, a number of flocculants were used to flocculate the precipitate formed via addition of TMT to a high Ag concentration solution of 3.5 g/L (20% Kodak Flexicolor Developer LORR, 5% Kodak Flexicolor Bleach III, 33% Kodak Flexicolor Fixer, 40% Kodak Flexicolor Stabilizer LF).

The basic protocol for the experiments involved the rapid addition of 15 ml of a TMT (15%) solution from a syringe to 500 ml of test solution with rapid mixing. The vessel used for the precipitation reaction was square in geometry and provided for excellent stirring with a paddle type gang stirrer (80 paddle RPM). The solution was allowed to stir for about 15 seconds while fine AgTMT precipitates formed. After the 15 second mixing period, sufficient flocculant was added to establish a 40 ppm concentration. The solution was rapidly stirred at 80 RPM for another 15 seconds. The paddle mixing speed was reduced to 50 RPM and stirring was continued for an additional 30 seconds. In the final mixing stage the rate of stirring was reduced further to 22 RPM for 1 min and an evaluation of the flocculating process was recorded. Four factors were given a numerical value for comparison (1=excellent, 7=extremely poor) Speed of Floc Formation, Floc Size, Settling Rate, and Supernatant Clarity, and eight different flocculant formulations were evaluated. The results are listed in the table below:

TABLE 4

| Flocculant Number | Mole % AETAC | Speed of Forming | Floc Size | Settling Rate | Supernatant Clarity |
|---|---|---|---|---|---|
| 1 | 1 | 1 | 1 | 1 | 3 |
| 2 | 4 | 2 | 3 | 3 | 2 |
| 3 | 7 | 3 | 3 | 2 | 2 |
| 4 | 10 | 4 | 3 | 4 | 2 |
| 5 | 13 | 4 | 4 | 4 | 4 |
| 6 | 22 | 5 | 4 | 4 | 4 |
| 7 | 27 | 6 | 5 | 5 | 5 |

TABLE 4-continued

| Flocculant Number | Mole % AETAC | Speed of Forming | Floc Size | Settling Rate | Supernatant Clarity |
|---|---|---|---|---|---|
| 8 | 36 | 6 | 6 | 6 | 6 |

A clear advantage is observed in flocculation of high Ag level test solutions with low AETAC mole % flocculant formulas. In fact, the best results were achieved with the lowest mole % AETAC containing polymeric flocculant.

EXAMPLE 6

In order to show the unique circumstances under which the various flocculating agents show the highest performance, a number of flocculants were used to flocculate the precipitate formed via addition of TMT to a low level Ag concentration of 260 ppm (Kodak Ektacolor Bleach Fix and Low Flow Wash).

The basic protocol for the experiments was the same as for example 5. Four factors were given a numerical value as in example 5. The results are listed in the table below:

TABLE 5

| Flocculant Number | Mole % AETAC | Speed of Forming | Floc Size | Settling Rate | Supernatant Clarity |
|---|---|---|---|---|---|
| 1 | 1 | 4 | 4 | 2 | 3 |
| 2 | 4 | 3 | 3 | 1 | 1 |
| 3 | 7 | 2 | 2 | 1 | 1 |
| 4 | 10 | 1 | 1 | 1 | 1 |
| 5 | 13 | 1 | 1 | 1 | 1 |
| 6 | 22 | 2 | 2 | 2 | 1 |
| 7 | 27 | 3 | 3 | 3 | 1 |
| 8 | 36 | 4 | 4 | 4 | 3 |

A clear advantage is observed in flocculation of low Ag level test solutions with medium AETAC mole % flocculant formulas. In fact, the best results were achieved with the 10 and 13 mole % AETAC containing polymer. Deviations from those mole % AETAC formulations gave much less satisfactory results.

The invention has been described in detail with particular reference to preferred embodiments thereof, but it will be understood that variations and modifications can be effected within the spirit and scope of the invention.

We claim:

1. A process for removing silver from a silver containing photoprocessing solution, comprising the steps of:
   a) mixing a mercapto-s-triazine, or a water soluble salt thereof, with the solution thereby causing formation of a mixture of i) precipitates and fines of silver mercapto-s-triazine and ii) the solution;
   b) mixing a copolymer flocculant with the mixture thereby causing flocculation and agglomeration of the fines of silver mercapto-s-triazine; wherein the copolymer i) comprises the monomers acryloyloxyethyl trimethylamine chloride and acrylamide and ii) has a reduced viscosity of 21 to 30 dL/g.

2. The process of claim 1 wherein the silver containing solution has a silver concentration less than 1 g/L and where the flocculant comprises from 4 to 27 mole percent acryloyloxyethyl trimethylamine chloride.

3. The process of claim 2 wherein the flocculant comprises from 7 to 20 mole percent acryloyloxyethyl trimethylamine chloride.

4. The process of claim 3 wherein the flocculant comprises from 9 to 14 mole percent acryloyloxyethyl trimethylamine chloride.

5. The process of claim 1 wherein the silver containing solution has a silver concentration of from 1 to 15 g/L and where the composition of the flocculant is from 0.1 to 7 mole percent acryloyloxyethyl trimethylamine chloride.

6. The process of claim 5 wherein the flocculant comprises from 0.3 to 4 mole percent acryloyloxyethyl trimethylamine chloride.

7. The process of claim 6 wherein the flocculant comprises from 0.5 to 2 mole percent acryloyloxyethyl trimethylamine chloride.

8. The process of any one of the preceding claims wherein in the flocculant is mixed with the mixture of step a) in claim 1 to achieve a flocculant concentration of 10 to 100 ppm.

9. The process of claim 1 wherein the silver containing solution is a seasoned photographic processing solution selected from the group consisting of stabilizers, fixers, bleach-fixers and mixtures of such processing solutions.

10. The process of claim 8 wherein the mercapto-s-triazine is selected from the group consisting of trimercapto-s-triazine and the trisodium salt thereof.

* * * * *